United States Patent [19]

Papenhagen et al.

[11] Patent Number: 5,794,490
[45] Date of Patent: Aug. 18, 1998

[54] CONTROL PEDAL UNIT FOR VEHICLES

[75] Inventors: Dieter Papenhagen, Waiblingen; Manfred Löchle, Stuttgart; Thorsten Meyer, Fellbach, all of Germany

[73] Assignee: Mercedes-Benz AG, Stuttgart, Germany

[21] Appl. No.: 692,501

[22] Filed: Aug. 5, 1996

[30] Foreign Application Priority Data

Aug. 29, 1995 [DE] Germany .................. 195 31 737.8

[51] Int. Cl.$^6$ .................................................. G05G 1/14
[52] U.S. Cl. .................................. 74/513; 74/560
[58] Field of Search ........................ 74/512, 513, 514, 74/560

[56] References Cited

U.S. PATENT DOCUMENTS

| 1,459,233 | 6/1923 | Moldenhauer | 74/513 |
| 1,595,695 | 8/1926 | Thomas | 74/513 |
| 3,302,763 | 2/1967 | Wobrock | 74/512 X |
| 3,988,945 | 11/1976 | Fasano | 74/560 X |

FOREIGN PATENT DOCUMENTS

| 0 141 947 | 5/1985 | European Pat. Off. . | |
| 0 430 600 | 6/1991 | European Pat. Off. . | |
| 27 28 787 | 1/1979 | Germany . | |
| 28 15 769 | 10/1979 | Germany . | |
| 5282061 | 10/1993 | Japan | 74/512 |
| WO86/00732 | 1/1986 | WIPO | 74/512 |
| WO 94/29584 | 12/1994 | WIPO . | |

*Primary Examiner*—Charles A. Marmor
*Assistant Examiner*—Mary Ann Battista
*Attorney, Agent, or Firm*—Klaus J. Bach

[57] ABSTRACT

In a vehicle control pedal unit comprising a mounting structure having a U-shaped mounting end with spaced parallel walls between which one end of a pedal lever having an eyepiece with an opening is pivotally supported, at least one return spring disposed between the mounting structure walls has one end operatively connected to the pedal lever and the other end mounted on a support wall structure extending across the spaced parallel walls such that the other spring end can be easily inserted into engagement with the support wall structure from outside the spaced parallel walls.

5 Claims, 5 Drawing Sheets

CONTROL PEDAL UNIT FOR VEHICLES

BACKGROUND OF THE INVENTION

The invention relates to a control pedal unit for vehicles with a pedal lever which is pivotally supported between U-shaped walls of a support structure and provided with a return spring effective on the pedal lever and engaged by the support structure.

EP 04 30 600 B1 discloses a control pedal unit for vehicles with a pedal attached to a pedal lever which is provided with a spiral return spring for returning the pedal lever to engine idle position.

Pedal units of this type are further shown in DE OS 28 15 769 and in DE OS 27 28 787. In both cases, the pedal lever is mounted on a support structure on a vehicle wall.

However, all these pedal units are relatively complicated in their designs and mounting them is correspondingly complicated as they consist of a multitude of components. The control pedal unit therefore needs to be assembled in place during the assembly of the vehicle.

EP 01 41 947 A2 discloses an electronic control pedal wherein an electric signal is generated which is proportional to the movement of the pedal. It includes spiral return springs which bias the control pedal toward its rest position.

WO94/29 584 discloses a control pedal unit which includes a bearing support structure consisting of spaced legs receiving a lever bearing in aligned bearing bores pivotally supporting a pedal lever which is biased to its rest position by a spiral spring whose one end engages the pedal lever and whose other end engages the bearing support structure.

These solutions, however, have the disadvantage that they require relatively large assembly efforts and, furthermore, that the spring mounting arrangement is problematic and, in any case, technically insufficient and therefore, not very reliable.

It is therefore the principal object of the present invention to provide a pedal unit without the disadvantages mentioned above, particularly a pedal unit, which is suitable to be manufactured efficiently in series and which can be fully and easily pre-assembled before installation in a vehicle.

SUMMARY OF THE INVENTION

In a vehicle control pedal unit comprising a mounting structure having a U-shaped mounting end with spaced parallel walls between which one end of a pedal lever having an eyepiece with an opening is pivotally supported at least one return spring disposed between the mounting structure walls has one end operatively connected to the pedal lever and the other end mounted on a support member extending across the spaced parallel walls such that the other spring end can be easily inserted into engagement with the support wall structure from outside the spaced parallel walls.

With the return spring mounting arrangement according to the invention the control pedal unit can be fully pre-assembled in a simple manner. Preferably, the support member is in the form of a slide bar which can be inserted, drawer-like into a guide structure formed on the support structure, whereby pre-assembly and particularly mounting of the spring is greatly facilitated.

Mounting of the springs and consequently, pre-assembly of the control lever unit is particularly simple if slots are provided between the leg walls of the support structure and the transverse wall through which the wire end portions of the spiral springs with hook-shaped ends extend.

Since the pedal unit is separate and independent of any vehicle components all that is needed for installation in a vehicle is to mount it onto a predetermined place within a vehicle which is generally the fire wall of the vehicle. Upon mounting the complete pedal unit is operational since also the return springs are pre-mounted and in their proper positions. No complicated installations procedures for the return springs or their pre-tensioning is necessary.

Advantageous embodiments of the invention are described below on the basis of the accompanying drawings.

DESCRIPTION OF A PREFERRED EMBODIMENT

Figure 1:
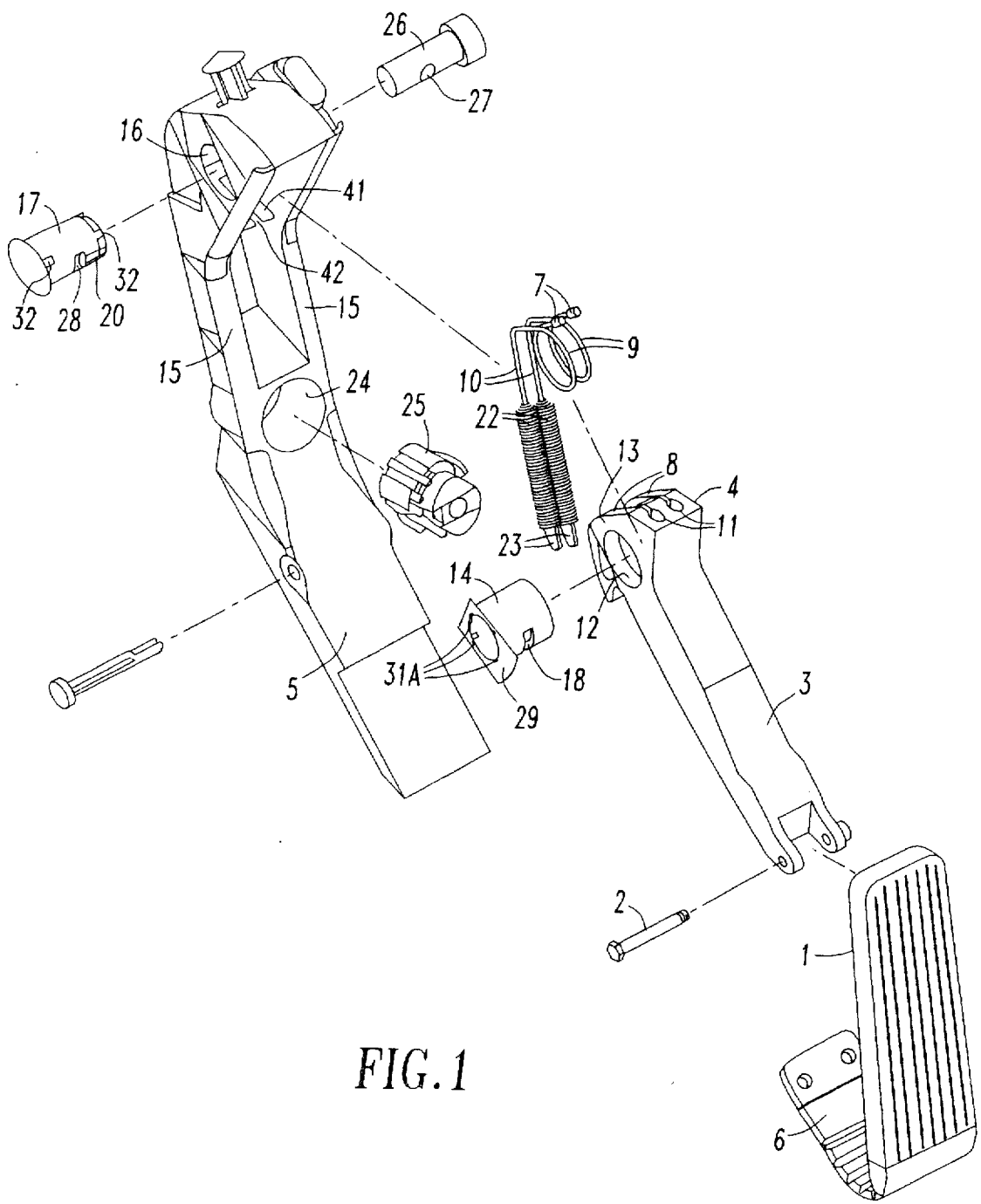
FIG. 1 is an exploded view of a control pedal unit according to the invention.

The vehicle control pedal unit includes a control pedal 1 which is connected to a pedal lever 3 by means of a hinge pin 2 in a well known manner. The pedal lever 3 has, at its end opposite its hinge connection with the control pedal 1, an eyepiece 4 by which it is pivotally supported on a mounting structure 5. At its end remote from the mounting structure 5, the pedal 1 may be provided with a hinge portion 6 by which it is connected to the mounting structure 5. After the pedal unit is completely assembled the mounting structure 5 can be mounted as a pre-assembled unit onto a vehicle wall. If desired, the pedal 1 may include at its end remote from its connection to the pedal lever 3, a hinge portion 6 which is connected to the mounting structure 5.

The eye piece 4 is provided with partial circumferential slots 8 disposed side-by-side in parallel relationship and extending over part of the outer wall of the eye piece 4 for receiving the end portions of connecting cables 10. The end portion of each connecting cable 10 forms a loop 9. Each connecting cable 10 passes from the outside, via a partially circumferential slot 8, to the inside of the eyepiece 4, that is into the eyepiece opening. The inner circumferential wall, that is the wall defining the opening of the eyepiece 4, includes two circumferential grooves 12 which are in radial alignment with the partially circumferential slots 8 and extend at least partially around the inner wall of the eyepiece 4. The two loops 9 of the connecting cables 10 are placed into the two circumferential grooves 12 where they remain in position because of their inner tension. The ends of the connecting cables 10 are provided with nipples 7 which are received and retained in corresponding cavities 11 formed in the outer circumferential wall of the eyepiece 4. The portions of the connecting cables 10 extending from the partial circumferential slots 8 are retained in guide slots formed in a rear portion of the eyepiece 4 which projects in the form of a cam structure 13.

After placement of the cable loops 9 into the inner circumferential grooves 12, a stationary bearing sleeve 14 is inserted into the eyepiece 4.

The bearing sleeve 14 has an axial length which exceeds slightly the width of eyepiece 4. In this way, it is clamped between the legs 15 of the mounting structure 5 which at least in the area in which the lever 3 is mounted, has the cross-sectional shape of a U. The sleeve 14 is therefore firmly retained between the legs 15 without any play. The bearing sleeve is therefore stationary and forms a friction sleeve between the loops 9 and the inner circumferential wall that is, the bearing opening of the eyepiece 4 of the pedal lever 3.

For firmly mounting the bearing sleeve, a slide hub 17 is inserted into the bearing sleeve 14 through the bearing opening 16 in the legs 15.

For the accurate positioning of a window 18 formed in the bearing sleeve 14 through which a carrier pin 19 (FIG. 2) is inserted, the bearing sleeve 14 is provided, at one end, with a frame-like positioning flange 29 by which the bearing sleeve 14 is properly located such that, during assembly of the bearing sleeve 14 and the pedal lever 3, the window 18 is in the proper position for inserting the carrier pin 19.

In order to insure that the bearing sleeve 14 is retained in its proper position in which its functional features are properly coordinated with features of adjacent components the slide hub 17 is provided with projections 20 and with stubs 32 and the projections are additionally provided with engagement lugs 20A.

The inner end wall of the bearing sleeve 14 and the inner leg wall of the mounting structure 5 are provided, around the bearing opening 16, with cutouts 21 and 31A (FIG. 3) which are adapted in size to the size of the stubs 32.

For the interconnection of the pedal lever 3 and the mounting structure 5, the slide hub 17 can be inserted, during assembly, through the bearing opening 16 into the bearing sleeve 14 only in a predetermined angular position in which the projections 20 are received in the corresponding asymmetrically arranged cutouts 31 in the bearing sleeve 14 in which they are lockingly engaged. When the parts are assembled the stubs 32 are disposed in the cutouts 31A of the bearing sleeve 14 and also in the cutouts 21 of the bearing opening 16. In this way the bearing sleeve 14 as well as the slide hub 17 are firmly connected with the mounting structure 5 so as to be stationary. The ends of the cables 10 remote from the free end provided with the nipples 7 are connected to spiral return springs 22 which, at their free ends have hooks 23 by which the springs are engaged, under tension, with the support structure 5 in a manner to be described below.

The mounting structure 5 is provided with a recess 24 for the reception of a kick-down switch 25 used in connection with vehicles with automatic transmissions.

In vehicles with manual transmissions a stop may be disposed in the recess 24. In this way, the control pedal unit may be used for vehicles with manual as well as with automatic transmissions.

Figure 2:
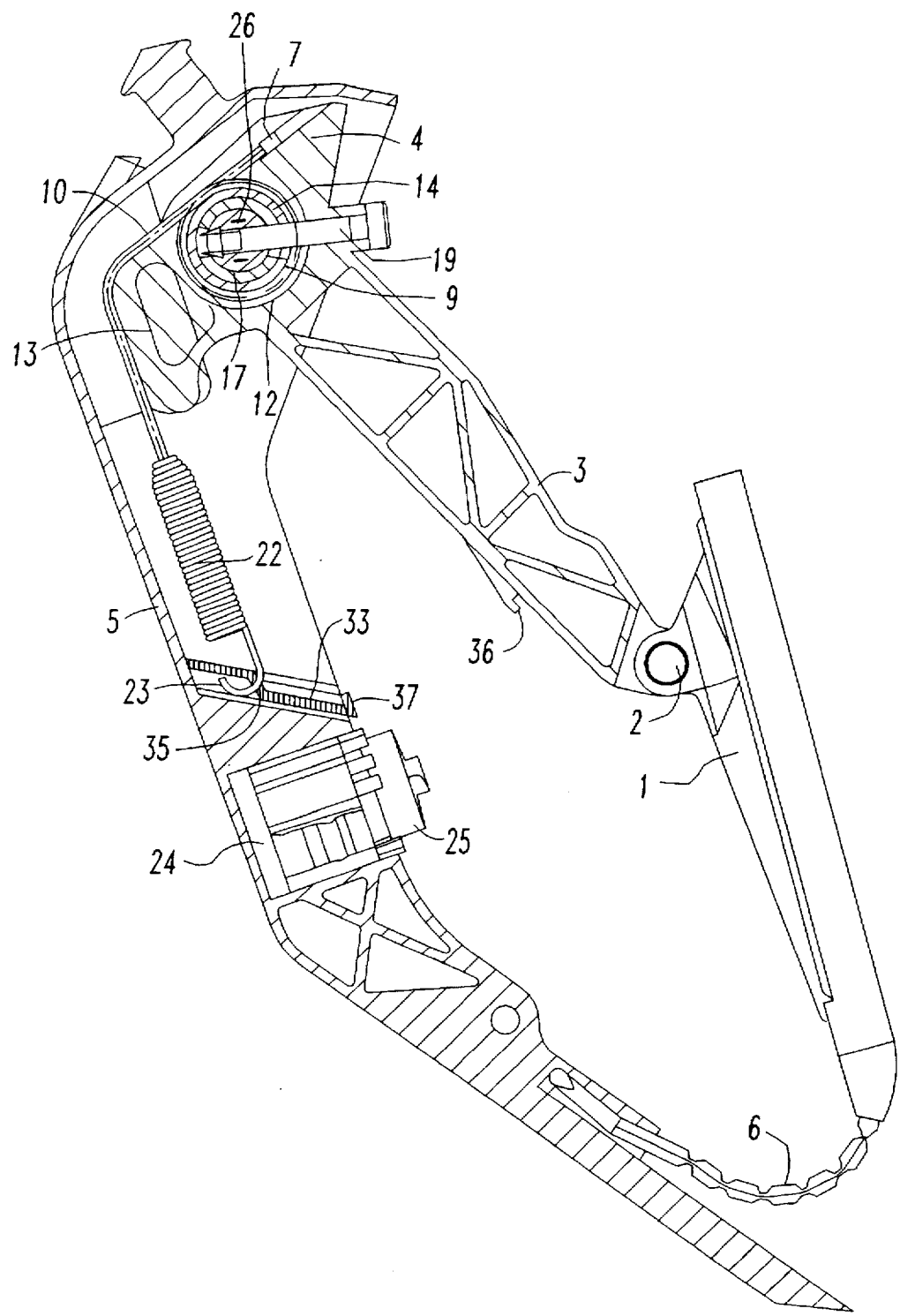
FIG. 2 is a side view of the control pedal unit of FIG. 1 shown partially in section.
Figure 3:
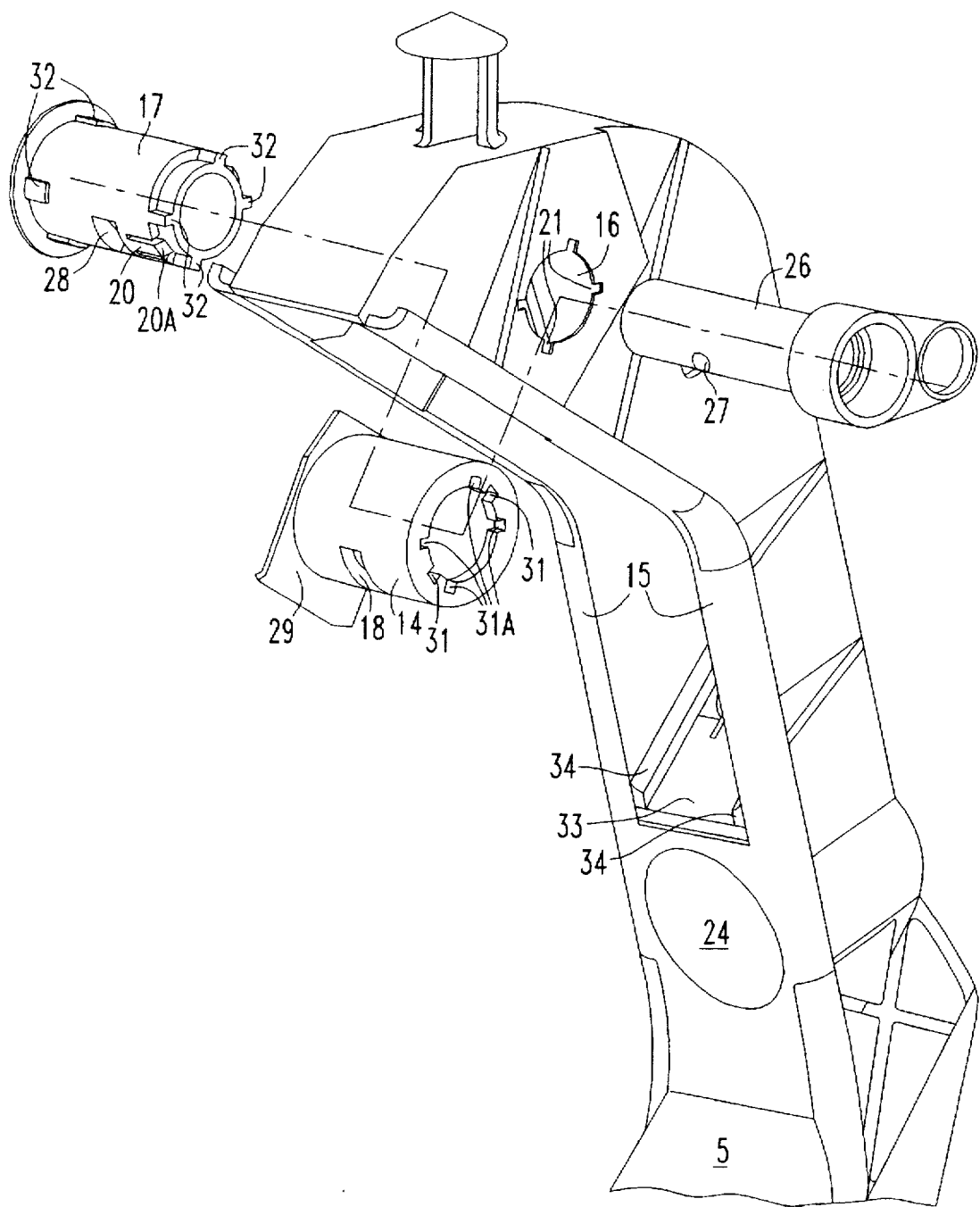
FIG. 3 is an enlarged perspective view of the bearing portion supporting the pedal lever with the associated components.

The control pedal unit as shown in FIGS. 1 to 3 is designed for electronic or electrical communication with the vehicle engine. For this reason, a sender shaft 26 with an annular magnet (not shown) is inserted into the slide hub 17 at the end thereof opposite the insertion end. The sender shaft 26 signals in a known manner the position of the sender shaft 26 and, consequently, of the control pedal 1 electrically or electronically to the vehicle engine for controlling the engine. For this purpose, the carrier pin 19 mounted in a bore in the pedal lever 3 is provided. The carrier pin 19 may be threaded into a threaded bore 27 or it may be otherwise engaged in the bore so as to be firmly mounted to the sender shaft 26. The slide hub 17 includes a window 28 which is in radial alignment with the window 18 in the bearing sleeve 14 and the carrier pin extends through the windows and is firmly connected to the pedal lever for movement therewith. The size of the two windows 18 and 28 is so selected that the carrier pin 19 and consequently the pedal lever 3 are freely movable between an upper stop which represents the idle position of the pedal lever and a lower stop which represents the full load position of the pedal lever.

The slide hub 17 serves two purposes: to mount the bearing sleeve 14 so that it is firmly located and to close the bearing sleeve 14 and it serves as a bearing structure for the sender shaft 26.

The two return springs 22 provide in connection with the connecting cables 10,that is with the two loops 9 of the connecting cables 10, for cable friction which gives the driver a certain feel which corresponds to the feel provided by a mechanical cable connection to the vehicle engine which is not present in this case.

The cam structure 13 has different radii such that lever arms of different length depending on the angular position of the pedal lever 3 are provided for the connecting cables 10 whereby the force applied to the pedal lever 3 for moving the pedal lever is changeable. The arrangement provides for a speed- or control pedal position dependent feel for the driver.

Below two possible solutions for the attachment of the return springs 22 to a transverse wall of the mounting structure 5 are described.

In accordance with FIG. 2, the transverse wall 33 is in the form of a separate slide member, which can be moved, drawer-like, into guide tracks 34 in the two legs 15 of the mounting structure 5. The hooks 23 of the two return springs 22 are received in bores 35 of the slide 33 which, for that purpose, is slightly Z-shaped in a cross-sectional view as seen from the side.

The slide member 33 facilitates pre-assembly and installation of the return springs 22. For the installation, that is before the hooks 23 are mounted on the mounting structure 5 and after the two loops 9 of the connecting cables 10 are placed into the circumferential grooves 12 of the bearing opening 16 of the eyepiece 4, the hooks 23 of the return springs 22 are hooked into the slide member 33. At this point, the slide member 33 is engaged with a mounting hook 36 of the pedal lever 3 which is disposed on the side thereof facing the mounting structure 5. The slide member 33 has, at its end remote from the insert end thereof in to the guide tracks 34, an eyelet or a bore via which the slide member 33 is engaged with the hook 36. Instead of having an eyelet, the slide member 33 may have a counter hook 37 which engages the hook 36.

As a result, the connecting cables 10 and the return springs 22 are held in a pre-assembled position in which the pedal lever 3 can be easily mounted onto the support structure 5. After insertion of the slide hub 17, the slide member 33 can then be disengaged from the hook 36 and inserted into the two guide tracks 34. The springs 22 are installed in this manner and the control pedal unit is fully assembled.

In order to prevent dislodging of the slide member 33 under load by the springs 22 from the guide tracks 34, the guide tracks 34 are preferably inclined such that the spring forces pull the slide member 33 into the guide tracks as the insert end of the guide tracks is at a greater distance from the opposite spring support area. In other words, the distance between the spring support point on the pedal lever and the connecting points of the return springs 22 is larger at the entrance end of the guide tracks so that a spring force is generated on the slide member 33 in direction which urges the slide member 33 inwardly whereby it is safely held in position.

Figure 4:
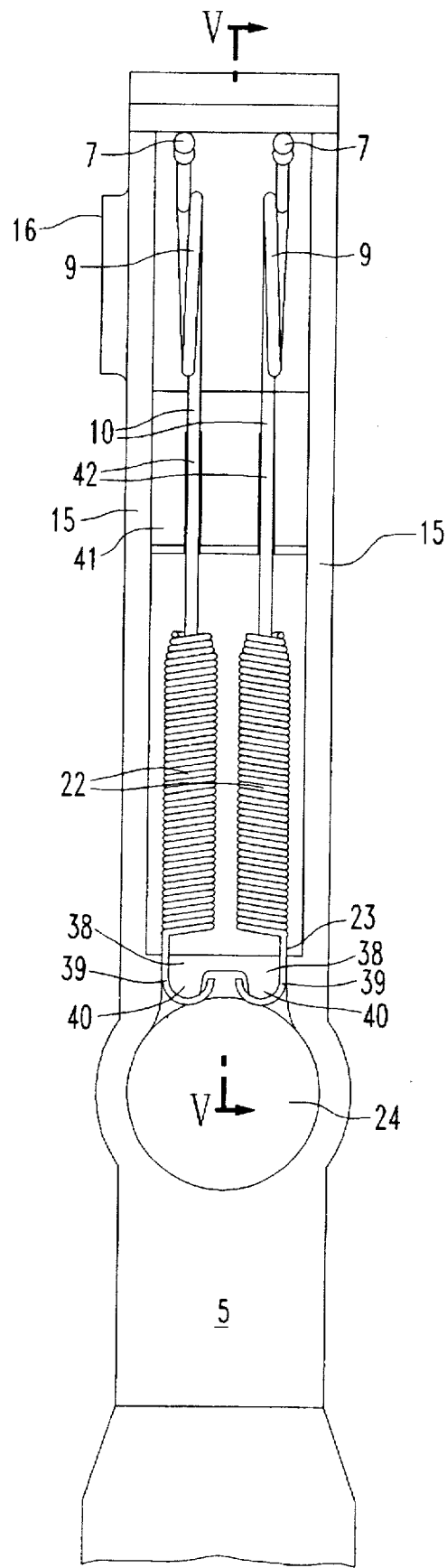
FIG. 4 is a perspective view of the pedal lever with return springs mounted thereon.
Figure 5:
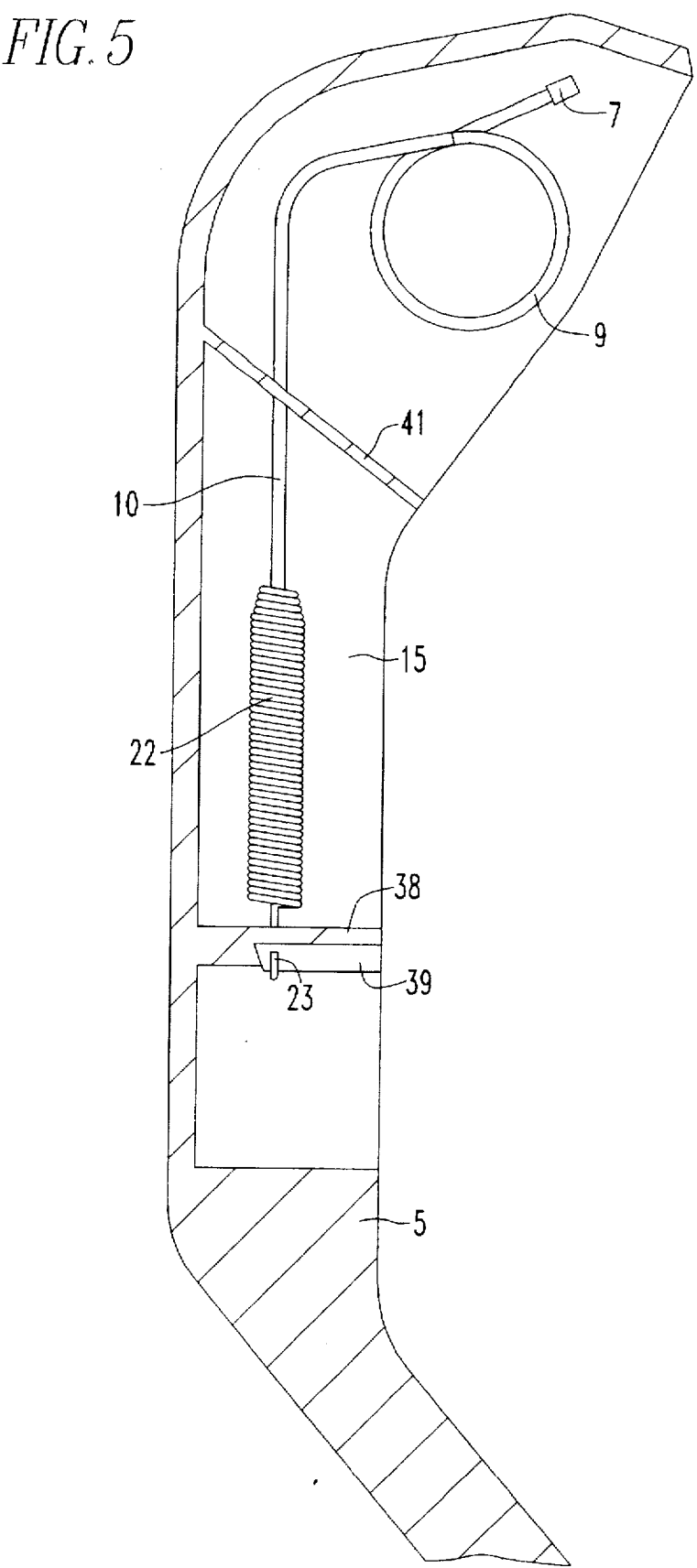
FIG. 5 is a partially perspective view of the pedal lever support structure shown without the pedal lever but with pre-mounted return springs and partially sectonalized to show the pedal lever for pivotal support structure.

FIGS. 4 and 5 show another mounting arrangement for the return springs 22 wherein a solid transverse wall 38 extends integrally between the two leg walls 15. The transverse wall 38 has slots 39 formed in its outer ends adjacent the leg walls 15. The slots 39 are wide enough such that the spring wires forming the hooks 23 can be inserted through the slots 39. The backside of the transverse wall 38 is provided with beads 40 around which the spring hooks 23 extend.

FIGS. 4 and 5 show a slotted wall 41 with slots 42 disposed between the return springs 22 and the pedal lever pivot bearing structure which extends transversely between the two leg walls 15 and provides a barrier in the space between the two leg walls 15. It only includes two slots which have such a width that the two connecting cables 10 can pass therethrough with some clearance. The slotted wall 41 serves as protection wall in case one of the return springs 10 breaks. The slotted wall 41 prevents broken spring parts from entering the area of the pedal lever bearing structure where they could possibly cause jamming or otherwise detrimentally affect the operation of the control lever unit.

The invention is not restricted to the exemplary embodiments described herein. It is for example, possible to use a mounting structure 5 wherein the control pedal is mounted on the pedal lever 3 without being hinged at the lower end to the mounting structure or the vehicle floor.

What is claimed is:

1. A control pedal unit for vehicles comprising a mounting structure having a U-shaped mounting end with spaced parallel leg walls having opposite inner sides, an elongated pedal lever having at one end an eyepiece with an opening where said pedal lever is pivotally supported between said leg walls, at least one return spring operatively connected at one end to a mounting point on said pedal lever for biasing said pedal lever into a rest position, guide tracks arranged opposite one another at the inner sides of said leg walls, said guide tracks being inclined such that they have an entrance end, which is disposed at a greater distance from said mounting point of said return spring than the rest of said guide tracks and a slide member supported in said guide tracks between said leg walls so as to be slideable in a direction essentially transverse to the direction in which said elongated pedal lever extends, said spring being supported at its other end by said slide member whereby said spring can be mounted to said mounting structure by moving said slide member, in a transverse direction, into said guide tracks between said leg walls.

2. A control pedal unit according to claim 1, wherein said slide member has an insert end and has, at its end remote from its insert end, a connecting structure and said pedal lever has a corresponding connecting structure by which said slide member can be supported, with said return spring attached thereto, by said pedal lever before said slide member is mounted to said mounting structure during assembly of said control pedal unit.

3. A control pedal unit according to claim 1, wherein said slide member is provided with an eyelet for receiving a hook at the other end of said return spring.

4. A control pedal unit according to claim 1, wherein a connecting cable extends from said one end of said spring, said connecting cable having its free end attached to said pedal lever at an outer wall area of said eyepiece and extending therefrom via a partial circumferential slot formed in said eyepiece to an interior portion of said eyepiece and around a bearing sleeve supporting said pedal lever and then again out of the interior portion of said eyepiece over an area of said eyepiece which projects in the form of a cam shaped in such a way that, upon pivoting of said pedal lever, different lever arm lengths are provided for the action of said spring on said pedal lever.

5. A control pedal unit according to claim 4, wherein a wall with a slot is disposed between said leg walls of said mounting structure and said connecting cable extends through said slot.

* * * * *